(12) United States Patent
Hwang et al.

(10) Patent No.: US 10,396,338 B2
(45) Date of Patent: Aug. 27, 2019

(54) BATTERY

(71) Applicant: SAMSUNG SDI CO., LTD., Yongin-si, Gyeonggi-do (KR)

(72) Inventors: San Hwang, Yongin-si (KR); Yuna Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 319 days.

(21) Appl. No.: 14/826,160

(22) Filed: Aug. 13, 2015

(65) Prior Publication Data

US 2016/0049632 A1    Feb. 18, 2016

(30) Foreign Application Priority Data

Aug. 14, 2014  (KR) .................. 10-2014-0106231
Aug. 14, 2014  (KR) .................. 10-2014-0106232
Apr. 6, 2015   (KR) .................. 10-2015-0048323

(51) Int. Cl.
| | |
|---|---|
| *H01M 2/26* | (2006.01) |
| *H01M 2/30* | (2006.01) |
| *H01M 2/22* | (2006.01) |
| *H01M 2/14* | (2006.01) |
| *H01M 2/04* | (2006.01) |

(52) U.S. Cl.
CPC ............. *H01M 2/263* (2013.01); *H01M 2/14* (2013.01); *H01M 2/22* (2013.01); *H01M 2/26* (2013.01); *H01M 2/30* (2013.01); *H01M 2/0426* (2013.01); *H01M 2/0469* (2013.01); *H01M 2/0473* (2013.01); *H01M 2/266* (2013.01)

(58) Field of Classification Search
None
See application file for complete search history.

(56) References Cited

U.S. PATENT DOCUMENTS

| | | | |
|---|---|---|---|
| 2003/0111512 A1 | 6/2003 | O'Connell et al. | |
| 2006/0141355 A1 | 6/2006 | Kang | |

(Continued)

FOREIGN PATENT DOCUMENTS

| | | | |
|---|---|---|---|
| EP | 1 659 651 A1 | 5/2006 | |
| EP | 2 154 738 A1 | 2/2010 | |

(Continued)

OTHER PUBLICATIONS

EPO Search Report dated May 12, 2016, for corresponding European Patent application 15180603.1, (12 pages).

(Continued)

*Primary Examiner* — Tracy M Dove
(74) *Attorney, Agent, or Firm* — Lewis Roca Rothgerber Christie LLP

(57) ABSTRACT

A battery includes an electrode assembly, a case accommodating the electrode assembly, a cap plate sealing an upper portion of the case, a coupling pin elongated downwardly from the cap plate to the electrode assembly such that the coupling pin is concave when the cap plate is viewed from above and convex when the cap plate is viewed from below, and an electrode lead coupled to the coupling pin which electrically connects the coupling pin and the electrode assembly to one another.
The battery may have a simple structure, reduced electrical resistance, an improved output performance.

16 Claims, 15 Drawing Sheets

(56) References Cited

U.S. PATENT DOCUMENTS

| | | | |
|---|---|---|---|
| 2007/0105015 A1* | 5/2007 | Munenaga | H01M 2/0404 |
| | | | 429/161 |
| 2007/0160904 A1 | 7/2007 | Uh | |
| 2007/0196732 A1 | 8/2007 | Tatebayashi et al. | |
| 2007/0232123 A1 | 10/2007 | Uh | |
| 2009/0155632 A1 | 6/2009 | Byun et al. | |
| 2010/0035132 A1 | 2/2010 | Park | |
| 2011/0244318 A1 | 10/2011 | Cho et al. | |
| 2011/0287291 A1* | 11/2011 | Byun | H01M 2/0426 |
| | | | 429/94 |
| 2011/0287302 A1 | 11/2011 | Kim | |
| 2012/0219849 A1 | 8/2012 | Kim | |
| 2012/0308855 A1 | 12/2012 | Shimizu et al. | |
| 2013/0202932 A1 | 8/2013 | Song et al. | |
| 2013/0295444 A1 | 11/2013 | Kim et al. | |
| 2016/0248072 A1 | 8/2016 | Jang et al. | |

FOREIGN PATENT DOCUMENTS

| | | |
|---|---|---|
| EP | 2 498 318 A1 | 9/2012 |
| EP | 2 506 358 A1 | 10/2012 |
| EP | 2 538 467 A1 | 12/2012 |
| EP | 2 597 703 A1 | 5/2013 |
| JP | 11-25993 A | 1/1999 |
| JP | 11-26008 A | 1/1999 |
| JP | 3332783 B2 | 10/2002 |
| JP | 2006-108018 A | 4/2006 |
| JP | 2011-70918 A | 4/2011 |
| JP | 2013-175516 A | 9/2013 |
| JP | 5481527 B2 | 4/2014 |
| JP | 2015-041615 A | 3/2015 |
| KR | 10-2006-0059703 A | 6/2006 |
| KR | 10-2007-0107921 | 11/2007 |
| KR | 10-2008-0035400 A | 4/2008 |
| KR | 10-2011-0111700 A | 10/2011 |
| KR | 10-2011-0127830 A | 11/2011 |
| KR | 10-2012-0097973 A | 9/2012 |
| KR | 10-2012-0108045 | 10/2012 |
| KR | 10-2013-0090190 A | 8/2013 |
| WO | WO 2013/125153 A1 | 8/2013 |

OTHER PUBLICATIONS

EPO Search Report dated May 12, 2016, for corresponding European Patent application 15180599.1, (11 pages).
EPO Search Report dated May 12, 2016, for corresponding European Patent application 15180600.7, (13 pages).
Patent Abstracts of Japan and Machine English Translation of JP 11-25993 A, Jan. 29, 1999, 20 Pages.
Patent Abstracts of Japan and Machine English Translation of JP 11-26008 A, Jan. 29, 1999, 14 Pages.
Patent Abstracts of Japan and Machine English Translation of JP 10-241741, Corresponding to JP 3332783 B2, Oct. 7, 2002, 15 Pages.
Machine English Translation of JP 2006-108018 A, Apr. 20, 2006, 31 Pages.
Patent Abstracts of Japan and Machine English Translation of JP 2011-70918 A, Apr. 7, 2011, 30 Pages.
Machine English Translation of JP 5481527 B2, Apr. 23, 2014, 45 Pages.
EPO Search Report dated Jan. 21, 2016, for corresponding European Patent application 15180600.7, (7 pages).
KIPO Office Action dated Aug. 22, 2016, corresponding to Korean Patent Application No. 10-2015-0048323 (9 pages).
EPO Search Report dated Jan. 25, 2016, for corresponding European Patent application 15180603.1, (7 pages).
EPO Search Report dated Jan. 22, 2016, corresponding to European Patent application 15180599.1, (7 pages).
U.S. Office Action dated Mar. 8, 2018, issued in U.S. Appl. No. 14/826,169 (11 pages).
EPO Office Action dated May 8, 2018, corresponding to European Patent Application No. 15180599.1 (5 pages).
U.S. Final Office Action dated Aug. 28, 2018, issued in U.S. Appl. No. 14/826,169 (12 pages).
U.S. Office Action dated Jan. 4, 2019, issued in U.S. Appl. No. 14/826,169 (12 pages).

* cited by examiner

BATTERY

CROSS-REFERENCE TO RELATED APPLICATIONS

This application claims priority to and the benefit of Korean Patent Application No. 10-2014-0106231, filed on Aug. 14, 2014, Korean Patent Application No. 10-2015-0048323, filed on Apr. 6, 2015, and Korean Patent Application No. 10-2014-0106232, filed on Aug. 14, 2014, in the Korean Intellectual Property Office, the entire contents of which are incorporated herein by reference.

BACKGROUND

1. Field

Aspects of one or more exemplary embodiments relate to a battery.

2. Description of the Related Art

Unlike primary batteries that are generally not rechargeable, secondary batteries are designed to be repeatedly dischargeable and rechargeable. Secondary batteries are often used as energy sources for mobile devices, such as mobile phones and laptops. Recently, much research has been conducted into the use of secondary batteries in electric automobiles and hybrid automobiles as an alternative energy source that can replace fossil fuels.

SUMMARY

One or more exemplary embodiments of the present invention are directed toward a battery having a simple structure and improved output performance due to a reduction in electrical resistance.

One or more embodiments of the present invention are directed toward a battery that is less prone to structural modification and/or less prone to a reduction in durability as a result of abrasion and interference between elements.

Additional aspects will be set forth in part in the description which follows and, in part, will be apparent from the description, or may be learned by practice of the presented embodiments.

According to one or more exemplary embodiments, a battery includes an electrode assembly; a case accommodating the electrode assembly; a cap plate sealing an upper portion of the case; a coupling pin elongated downwardly from the cap plate toward the electrode assembly such that the coupling pin is concave when the cap plate is viewed from above and convex when the cap plate is viewed from below; and an electrode lead coupled to the coupling pin. The electrode lead electrically connects the coupling pin and the electrode assembly to one another.

The coupling pin may extend from the cap plate without a joint.

The coupling pin and the cap plate may be monolithic.

The electrode lead may have a coupling hole into which the coupling pin is inserted.

The coupling pin and the coupling hole may have corresponding non-circular cross-sections.

The coupling pin and the coupling hole may have angular cross-sections.

The coupling pin and the coupling hole may have oval cross-sections.

The coupling pin and the coupling hole may include a circular part and at least one wedge-shaped part protruding from an outer diameter of the circular part.

The coupling pin may closely contact the coupling hole and be fixed in the coupling hole by forced insertion.

According to one or more exemplary embodiments, a battery includes an electrode assembly; a case accommodating the electrode assembly; a cap plate sealing an upper portion of the case; a coupling pin protruding downwardly from the cap plate toward the electrode assembly; and an electrode lead coupled to the coupling pin. The electrode lead electrically connects the coupling pin and the electrode assembly to one another, wherein the electrode lead includes a portion defining an avoidance space to accommodate a lower end of the coupling pin.

The lower end of the coupling pin, which is exposed through a lower surface of the electrode lead, may be pressed onto the electrode lead by riveting or by a spinning process.

The electrode lead may include a first part that faces and is coupled to the cap plate; and a second part bent relative to the first part and that faces and coupled to an electrode tab projecting from the electrode assembly. The second part of the electrode lead may define the avoidance space.

The second part of the electrode lead may include two parts separated by the avoidance space therebetween.

The second part of the electrode lead may have the shape of a plate and the avoidance space in the second part may be a hole.

The second part of the electrode lead may include a first layer and a second layer, and the electrode tab may be between the first and second layers.

The second part of the electrode lead may include a first layer and a second layer, and the electrode tab may be on the first and second layers.

The second part of the electrode lead may include a first layer and a second layer. The first layer may include two parts separated by an avoidance space therebetween. The second layer may include a plate. The second layer may cover a portion of the avoidance space of the first layer.

The second part of the electrode lead may include a first layer and a second layer. Both the first and second layers may include two parts separated by an avoidance space therebetween.

The electrode lead may include folds that connect the first and second parts such that the first and second parts are bent with respect to each other. The first part may expand between two folds that are spaced apart.

A coupling pin, which extends through the electrode lead, may be coupled to an expanded portion of the first part.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
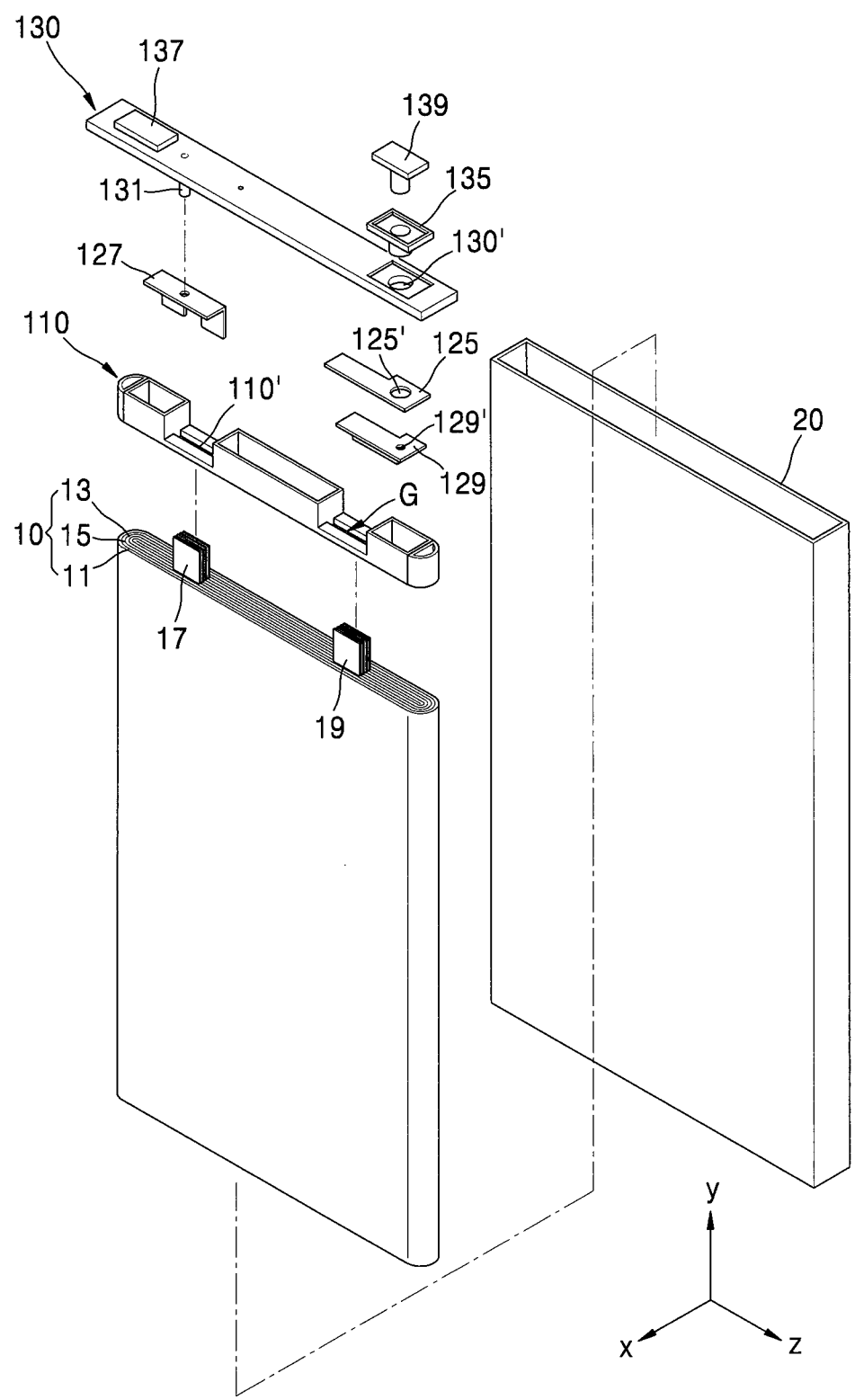
FIG. 1 is an exploded perspective view of a battery according to an exemplary embodiment.

Batteries according to exemplary embodiments are described with reference to the accompanying drawings. Expressions such as "at least one of," when preceding a list of elements, modify the entire list of elements and do not modify the individual elements of the list. Further, the use of "may" when describing embodiments of the present invention refers to "one or more embodiments of the present invention." When a first element is described as being "coupled" or "connected" to a second element, the first element may be directly "coupled" or "connected" to the second element, or one or more other intervening elements may be located between the first element and the second element.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present inventive concept.

The terminology used herein is for the purpose of describing particular embodiments only and is not intended to be limiting of the inventive concept. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

As used herein, the term "substantially," "about," and similar terms are used as terms of approximation and not as terms of degree, and are intended to account for the inherent deviations and/or variations in measured or calculated values that would be recognized by those of ordinary skill in the art.

FIG. 1 is an exploded perspective view of a battery according to an exemplary embodiment.

Referring to FIG. 1, the battery includes an electrode assembly 10, an insulating spacer 110 disposed on the electrode assembly 10, a case 20 that accommodates the electrode assembly 10 and the insulating spacer 110, and a cap plate 130 that covers an upper portion of the case 20.

The electrode assembly 10 is a rechargeable secondary battery and may be a lithium-ion battery. The electrode assembly 10 may include a positive electrode plate 11, a negative electrode plate 13, and a separator 15. The electrode assembly 10 may be sealed inside the case 20 with an electrolyte.

For example, the electrode assembly 10 may be formed by winding a stack of the positive electrode plate 11, the negative electrode plate 13, and the separator 15 in the form of a jelly roll. The positive electrode plate 11 may be formed by coating a positive active material on at least one surface of a positive collector. Similarly, the negative electrode plate 13 may be formed by coating a negative active material on at least one surface of a negative collector.

For example, according to an exemplary embodiment, the positive electrode plate 11 may be placed at an outermost side of the electrode assembly 10. Placing a positive electrode assembly (that emits a relatively large amount of heat) at an outer side near the case 20 accelerates heat emission through the case 20. For example, the positive electrode assembly may directly or thermally contact the case 20. Herein, the term "thermally contact" indicates that two elements do not necessarily directly contact one another, but there is thermal interaction between the elements.

The electrode assembly 10 may be accommodated in the case 20 with an electrolyte through an upper opening of the case 20. The upper opening of the case 20 may be sealed by the cap plate 130. A portion where the cap plate 130 contacts the case 20 may be welded by a laser and thus air-tightly sealed.

A positive electrode tab 17 and a negative electrode tab 19 may be connected to at least one portion of the positive electrode plate 11 and the negative electrode plate 13, respectively. Herein, the positive and negative electrode tabs 17 and 19 may be referred to as "electrode tabs 17 and 19." A high-capacity, high-output battery may include a plurality of positive electrode tabs 17 and a plurality of negative electrode tabs 19 that project from the electrode assembly 10. The plurality of positive electrode and negative electrode tabs 17 and 19 may provide high-current electric output and reduce resistance loss.

The positive electrode tab 17 may be connected to the cap plate 130, and the negative electrode tab 19 may be connected to a negative electrode terminal 139 that projects from an upper surface of the cap plate 130. For example, a positive electrode terminal 137 and the negative electrode terminal 139 may be exposed on the upper surface of the cap plate 130. The positive electrode terminal 137 may be formed as a portion of the cap plate 130 that integrally protrudes from the cap plate 130 or as an additional element that is coupled to the cap plate 130. The positive electrode terminal 137 may have a positive polarity that is the same as the cap plate 130. However, this does not imply that the positive electrode terminal 137 is clearly distinguishable from the cap plate 130. For example, the positive electrode terminal 137 may be the cap plate 130. As another example, a battery with low capacitance may not include an additional terminal and the positive electrode terminal 137 may refer to the cap plate 130.

The negative electrode terminal 139 may be formed of an additional element that is assembled by penetrating through the cap plate 130. The negative electrode terminal 139 may be insulatingly coupled to the cap plate 130 and may protrude on the upper surface of the cap plate 130. Herein, one or both of the positive electrode terminal 137 and the negative electrode terminal 139 may be referred to as "electrode terminals 137 and 139." For example, an electrode terminal of the claims may be a positive electrode terminal.

The positive and negative electrode tabs 17 and 19 may form single packs that are inserted into tab openings 110' (e.g., tab holes 110') of the insulating spacer 110 and penetrate through an upper portion of the insulating spacer 110. Upper ends of the positive and negative electrode tabs 17 and 19 that penetrate through the insulating spacer 110 may be respectively connected to a positive electrode lead 127 and a negative electrode lead 129.

Before the positive electrode tab 17 is inserted into the insulating spacer 110, the plurality of positive electrode tabs 17 may be formed in a single pack by temporary welding. The plurality of positive electrode tabs 17 formed in a single pack by temporary welding may be easily inserted into the tab hole 110'. Similarly, before the negative electrode tab 19 is inserted into the insulating spacer 110, the plurality of negative electrode tabs 19 may be formed in a single pack by temporary welding.

The positive electrode tab 17 extends through the upper portion of the insulating spacer 110 by penetrating through the tab hole 110' of the insulating spacer 110, and the upper end of the positive electrode tab 17 is connected to the positive electrode lead 127. The positive electrode lead 127 is also connected to the cap plate 130. Accordingly, the positive electrode tab 17 of the electrode assembly 10 is electrically connected with the cap plate 130 via the positive electrode lead 127. The entire cap plate 130 may have a positive polarity that is the same as the positive electrode tab 17, and a portion of the cap plate 130 may form the positive electrode terminal 137.

Herein, one or both of the positive electrode lead 127 and the negative electrode lead 129 may be referred to as "electrode leads 127 and 129." For example, an electrode lead of the claims may be a positive electrode lead.

Figure 2:
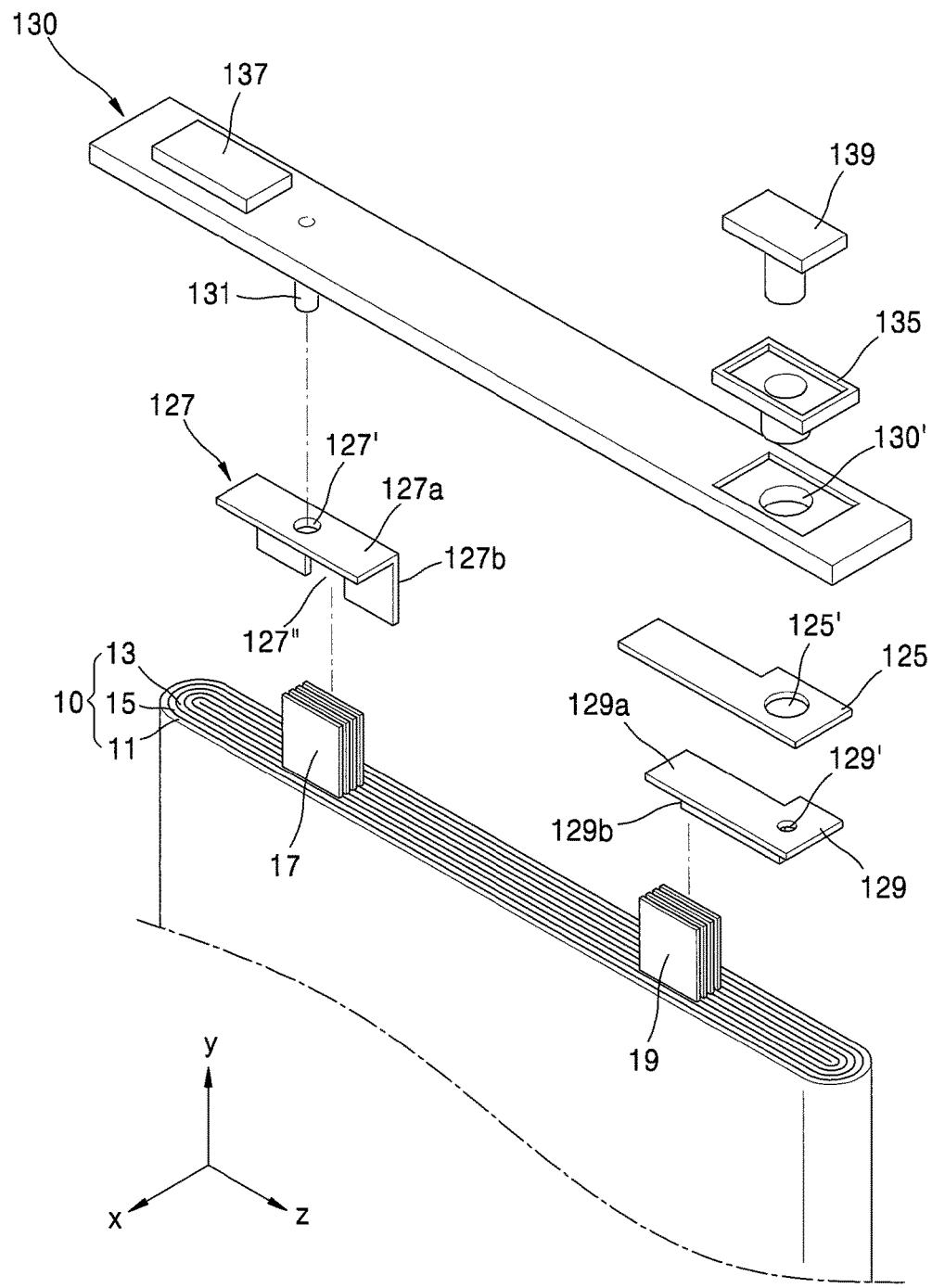
FIG. 2 is an exploded perspective view of a portion of the battery of FIG. 1.

FIG. 2 is an exploded perspective view of a portion of the battery of FIG. 1. Referring to FIG. 2, the positive electrode lead 127 may be bent in an 'L' shape. For example, the positive electrode lead 127 may be bent and extend in two different directions. A first part 127a of the positive electrode lead 127 may be oriented to face the cap plate 130 and coupled to the cap plate 130. Also, a second part 127b of the positive electrode lead 127, which extends in a different direction from the first part 127a, may be oriented to face the positive electrode tab 17 and coupled to the positive electrode tab 17. Therefore, in order to be coupled to the cap plate 130 and the positive electrode tab 17, the positive electrode lead 127 may be bent in different directions such that the first part 127a faces and is coupled to the cap plate 130 and the second part 127b faces and is coupled to the positive electrode tab 17.

The second part 127b of the positive electrode lead 127 may be divided. For example, the second part 127b of the positive electrode lead 127 may include an avoidance space 127" to avoid mechanical interference between the second part 127b and a coupling pin 131. When an end of the coupling pin 131 is riveting or spinning processed during coupling of the cap plate 130 and the positive electrode lead 127, the avoidance space 127" provides extra space to accommodate an end of the coupling pin 131 that may expand when pressed with a manufacturing tool. For example, an end of the coupling pin 131 includes an expanding head unit that is pressed onto a coupling surface and expands, and the head unit of the coupling pin 131 may be accommodated in the avoidance space 127".

In some exemplary embodiments, the positive electrode lead 127 may include the first part 127a shaped like a plate, the second part 127b divided into two parts with the avoidance space 127" in between, and the first and second parts 127a and 127b may be bent with respect to each other.

According to other exemplary embodiments, the avoidance space 127" may be omitted in the positive electrode lead 127. For example, depending on a size of the coupling pin 131 that functions as a coupling medium of the cap plate 130 and the positive electrode lead 127, the avoidance space 127" may be omitted in the positive electrode lead 127. For example, if the coupling pin 131 is relatively large, i.e., if the coupling pin 131 has a large diameter, the positive electrode lead 127 may have the avoidance space 127". Alternatively, if the coupling pin 131 is relatively small, i.e., if the coupling pin 131 has a small diameter, the avoidance space 127" may be omitted in the positive electrode lead 127. The avoidance space 127", which divides the second part 127b of the positive electrode lead 127, may cause a decrease in mechanical strength. Thus, the size of the coupling pin 131 may vary according to the mechanical strength that is required between the cap plate 130 and the positive electrode lead 127.

Figure 3:
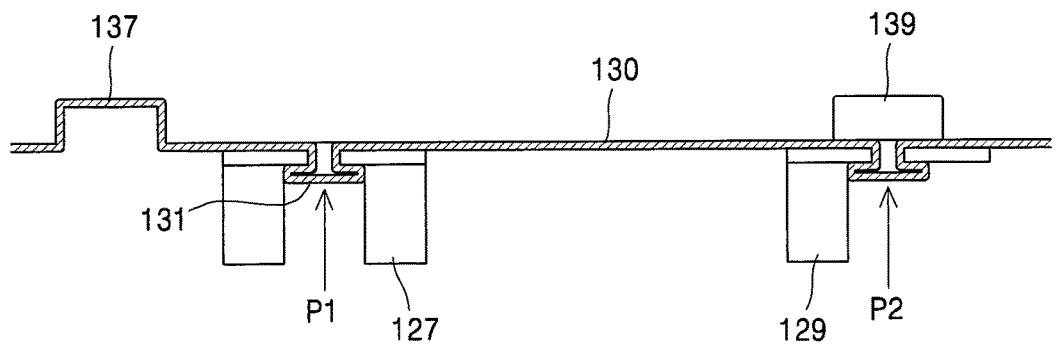
FIG. 3 is a side view of a coupling structure between elements illustrated in FIG. 2.

FIG. 3 is a side view of a coupling structure between elements illustrated in FIG. 2.

Referring to FIG. 3, the positive electrode lead 127 may be coupled to the cap plate 130 via the coupling pin 131 that protrudes from the cap plate 130. For example, the coupling pin 131 that protrudes from a lower surface of the cap plate 130 may penetrate through the positive electrode lead 127, and a lower end of the coupling pin 131 that is exposed through a lower surface of the positive electrode lead 127 may be pressed onto the lower surface of the positive electrode lead 127 by riveting or spinning (at a coupling position P1). For example, during riveting, the lower end of the coupling pin 131 (that is exposed through the lower surface of the positive electrode lead 127) is hit with a hammer so that the lower end of the coupling pin 131 is pressed onto the lower surface of the positive electrode lead 127. During spinning, pressure is applied to the lower end of the coupling pin 131 (that is exposed through the lower surface of the positive electrode lead 127) with a quickly rotating manufacturing tool so that the lower end of the coupling pin 131 is pressed onto the lower surface of the positive electrode lead 127. In another exemplary embodiment, the positive electrode lead 127 and the cap plate 130 may be welded to each other. The coupling structure between the negative electrode lead 129 and the cap plate 130 are described below.

Referring to FIGS. 1 and 2, the negative electrode tab 19 penetrates through the tab hole 110' of the insulating spacer 110 and is exposed through the upper portion of the insulating spacer 110, and an exposed upper end of the negative electrode tab 19 is connected to the negative electrode lead 129. The negative electrode lead 129 is then coupled to the negative electrode terminal 139. Accordingly, the negative electrode tab 19 of the electrode assembly 10 is electrically connected to the negative electrode terminal 139 via the negative electrode lead 129.

The negative electrode lead 129 may be entirely bent in an 'L' shape. In other words, a first part 129a of the negative electrode lead 129 may face the cap plate 130 and be coupled to the cap plate 130. Also, a second part 129b of the negative electrode lead 129, which extends in a different direction from the first part 129a, may face the negative electrode tab 19 and be coupled to the negative electrode tab 19. In order to be coupled to the cap plate 130 and the negative electrode tab 19, the negative electrode lead 129 may be bent in different directions such that the first part 129a faces and is coupled to the cap plate 130 and the second part 127b faces and is coupled to the negative electrode tab 19. However, exemplary embodiments are not limited thereto, and for example, the negative electrode lead 129 may be shaped in the form of a flat plate.

The negative electrode terminal 139 is assembled in the cap plate 130 with a gasket 135 between the negative electrode terminal 139 and the cap plate 130, as shown in FIG. 2. The cap plate 130 includes a terminal opening 130' (e.g., a terminal hole 130') through which the negative electrode terminal 139 passes. The negative electrode terminal 139 is inserted into the terminal hole 130' of the cap plate 130 with the gasket 135 in between such that the negative electrode terminal 139 may be electrically insulated from the cap plate 130. The gasket 135 may seal a surrounding area of the terminal hole 130' so that the electrolytes accommodated in the case 20 do not leak and external impurities are blocked.

An insulating plate 125 may be provided between the negative electrode lead 129 and the cap plate 130 to electrically insulate the negative electrode lead 129 and the cap plate 130. The insulating plate 125 and the gasket 135 electrically insulate the cap plate 130, which is electrically connected to the positive electrode tab 17 of the electrode assembly 10, from an opposite polarity. The negative electrode lead 129 and the insulating plate 125 may respectively include terminal openings 125' and 129' (e.g., terminal holes 125' and 129') through which the negative electrode terminal 139 passes.

The negative electrode terminal 139 passes through the terminal holes 125', 129', and 130' of the insulating plate 125, the negative electrode lead 129, and the cap plate 130, respectively. When a lower portion of the negative electrode terminal 139 is pressed onto a lower surface of the negative electrode lead 129, the cap plate 130, the insulating plate 125, and the negative electrode lead 129 may be aligned and integrally coupled to one another.

For example, the negative electrode terminal 139 may be pressed onto the lower surface of the negative electrode lead 129 by stacking the cap plate 130, the negative electrode lead 129, and the insulating plate 125 on one another, inserting the negative electrode terminal 139 into the terminal holes 125', 129', and 130' from an upper portion of the cap plate 130, and riveting or spinning the lower portion of the negative electrode terminal 139, which is exposed through the lower surface of the negative electrode lead 129.

Referring to FIG. 3, although the lower portion of the negative electrode terminal 139 is pressed onto the lower surface of the negative electrode lead 129, the lower portion of the negative electrode terminal 139 may also be welded so that the negative electrode terminal 139 is more stably attached to the negative electrode lead 129 (at a coupling position P2). This is generally more stable because coupling the negative electrode terminal 139 and the negative electrode lead 129 forms a charge/discharge path on a negative electrode side. An upper portion of the negative electrode terminal 139 may include a plate protruding from a cylindrical body and may be pressed onto the upper surface of the cap plate 130. (The illustrations of the gasket 135 and the insulating plate 125 are eliminated in FIG. 3.)

Referring to FIG. 1, similar to the insulating plate 125 between the cap plate 130 and the negative electrode lead 129, an additional plate may be between the cap plate 130 and the positive electrode lead 127. The additional insulating plate may be inserted to maintain a distance between the cap plate 130 and the positive electrode lead 127 that is substantially the same as a distance between the cap plate 130 and the negative electrode lead 129. Also, the additional insulating plate may be between the cap plate 130 and the positive electrode lead 127 to increase a coupling strength generated when pressed by the coupling pin 131.

The insulating spacer 110 is disposed between the electrode assembly 10 and the cap plate 130. The insulating spacer 110 is formed of an insulating material to prevent electrical interference or a short circuit between the electrode assembly 10 and the cap plate 130. For example, the insulating spacer 110 may be disposed between the electrode assembly 10 and the electrode leads 127 and 129. Also, the insulating spacer 110 collects the electrode tabs 17 and 19 of the electrode assembly 10 so that electrical connection with the electrode leads 127 and 129 is easily conducted.

For example, the plurality of positive and negative electrode tabs 17 and 19 that protrude upward from the electrode assembly 10 may be respectively collected as a pack as they penetrate through the tab holes 110' of the insulating spacer 110. The respective packs of the positive and negative electrode tabs 17 and 19 may be electrically connected to the positive and negative electrode leads 127 and 129 by welding.

The insulating spacer 110 may secure an appropriate amount of space between the electrode assembly 10 and the cap plate 130 so that the electrode tabs 17 and 19 are insulated even when subjected to external shock, such as from falling or other causes.

The insulating spacer 110 may include a welding groove G to weld the electrode tabs 17 and 19 and the electrode leads 127 and 129. For example, the welding groove G may be formed on the tab holes 110' of the electrode tabs 17 and 19. The welding groove G may allow the positive and negative electrode tabs 17 and 19, which pass through the tab holes 110', to be exposed through the insulating spacer 110, and to be welded with the positive and negative electrode leads 127 and 129, respectively. For example, in some exemplary embodiments, the electrode tabs 17 and 19 and the electrode leads 127 and 129 may be welded by ultrasonic welding.

According to an exemplary embodiment, the positive electrode lead 127 and the cap plate 130 may be coupled to each other by using the coupling pin 131 that protrudes from the cap plate 130. For example, the coupling pin 131 that protrudes from the cap plate 130 may penetrate through the positive electrode lead 127, and the lower end of the coupling pin 131, which is exposed through the lower surface of the positive electrode lead 127, may be pressed onto the lower surface of the positive electrode lead 127 by using a hammer and/or quickly rotating manufacturing tool. However, it will be appreciated by one skilled in the art that according to exemplary embodiments, the cap plate 130 and the positive electrode lead 127 may be coupled according to different methods. For example, the coupling pin 131 which couples the cap plate 130 and the positive electrode lead 127 may be formed on the cap plate 130 or on the positive electrode lead 127. Also, for example, the cap plate 130 and the positive electrode lead 127 may be coupled to each other by welding.

The coupling of the positive electrode lead 127 and the cap plate 130 may form a charge/discharge path between the electrode assembly 10 and the positive electrode terminal 137. In other words, the contact and coupling of the positive electrode lead 127 and the cap plate 130 may affect the electrical resistance of the charge/discharge path.

Figure 4A:
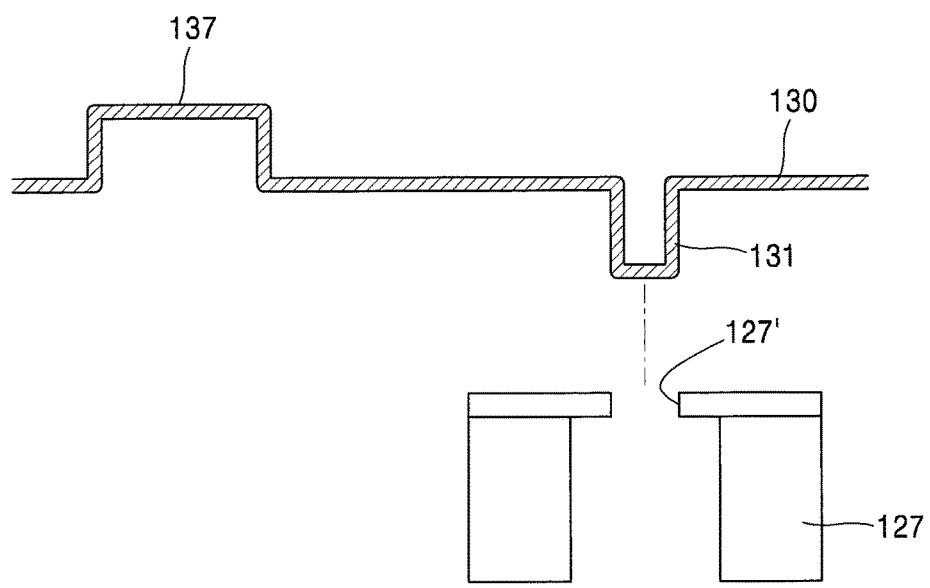
FIGS. 4A and 4B are side views of the coupling structure of FIG. 3 between a coupling pin and a positive electrode lead.
Figure 4B:
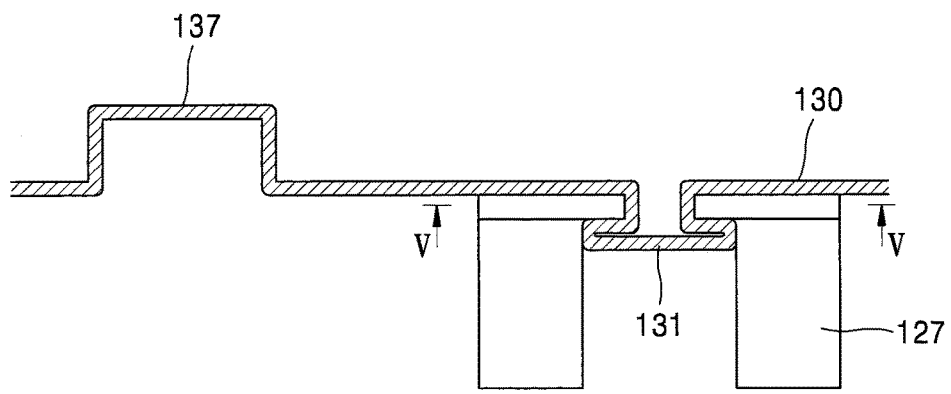

FIGS. 4A and 4B are side views of the coupling structure of FIG. 3 between the coupling pin 131 and the positive electrode lead 127.

Referring to FIGS. 4A and 4B, the coupling pin 131 may be elongated downwardly from the cap plate 130. For example, the coupling pin 131 may be elongated downwardly from the upper surface of the cap plate 130 and thus protrude downwardly. By integrally forming the cap plate 130 and the coupling pin 131 by elongating a portion of the cap plate 130 downward, additional welding is not necessary to form the coupling pin 131. Accordingly, the coupling pin 131 may be integrally formed from the cap plate 130, and be elongated from the cap plate 130 without a joint. That is, since the coupling pin 131 is not formed by attaching an additional element on the cap plate 130 but by elongating the cap plate 130, the coupling pin 131 may be formed by using the same material as the cap plate 130 and integrally elongated from the cap plate 130 without a joint.

The coupling pin 131 may be formed by pressing the upper surface of the cap plate 130 downward with a manufacturing tool (e.g., a predetermined manufacturing tool) and thus the cap plate 130 is concave when viewed from the above and integrally elongated when viewed from the below. That is, the coupling pin 131 may be shaped as if it is engraved. When the cap plate 130 is viewed from above, the coupling pin 131 may be concave, and when the cap plate 130 is viewed from below, the coupling pin 131 may be convex.

For example, since the coupling pin 131 is integrally elongated from the cap plate 130, an additional element does not have to be coupled to the cap plate 130. If an additional coupling pin is welded to the cap plate 130, the welding strength of the coupling pin that is in a limited area may be insufficient. A welding process of the coupling pin 131 needs strict management or a particular welding method needs to be performed to obtain sufficient welding strength, which may decrease overall manufacturing efficiency.

Since the coupling pin 131 is integrally elongated from the cap plate 130, a coupling interface between different elements which interferes with a flow of current is not formed at least between the coupling pin 131 and the cap plate 130. Thus, an electrical resistance between the coupling pin 131 and the positive electrode terminal 137 is reduced. For example, according to an exemplary embodiment, the coupling pin 131 and the positive electrode terminal 137 may both be integrally formed from the cap plate 130. The coupling pin 131 may be integrally elongated downwardly from the cap plate 130, and the positive electrode terminal 137 may be integrally elongated upwardly from the cap plate 130. In this case, a coupling interface between different elements which interferes with a flow of current is not formed between the coupling pin 131 and the positive electrode terminal 137. Thus, electrical resistance does not increase around the positive electrode terminal 137.

According to a comparative example, the coupling pin 131 is formed as an additional element and welded to the cap plate 130. A coupling interface between the coupling pin 131 and the cap plate 130 may interfere with a flow of current on a charge/discharge path and increase electrical resistance. Thus, electrical resistance around the positive electrode terminal 137 increases.

Figure 5:
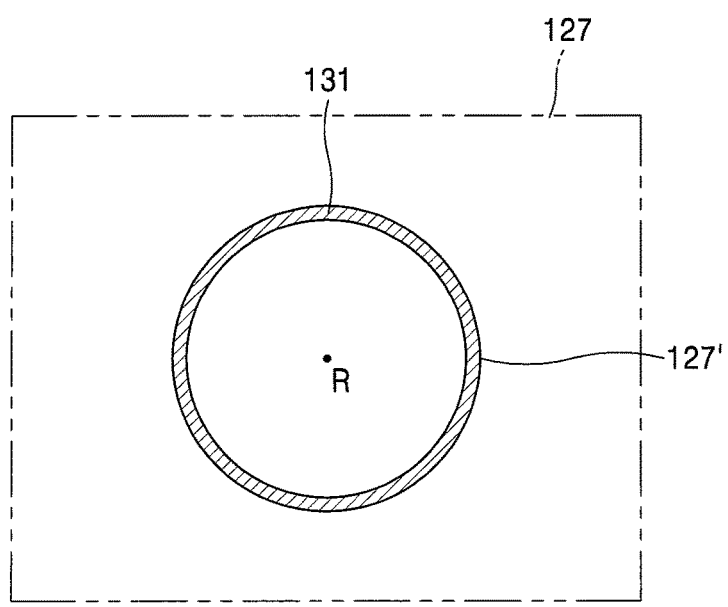
FIG. 5 is a cross-sectional view of the coupling structure cut along the line V-V of FIG. 4B.

FIG. 5 is a cross-sectional view of the coupling structure cut along the line V-V of FIG. 4B.

Referring to FIG. 5, the coupling pin 131 may have a circular cross-section, and a coupling opening 127' (e.g., a coupling hole 127') of the positive electrode lead 127, into which the coupling pin 131 is inserted, may also have a circular cross-section. The coupling pin 131 and the coupling hole 127' may have corresponding circular shapes.

The coupling structure between the coupling pin 131 and the positive electrode lead 127 is not limited to a circular structure as described above. According to another exemplary embodiment, the coupling structure between the coupling pin 131 and the positive electrode lead 127 may be modified in various ways to increase a coupling strength between the coupling pin 131 and the positive electrode lead 127. Examples are provided below.

Figure 6:
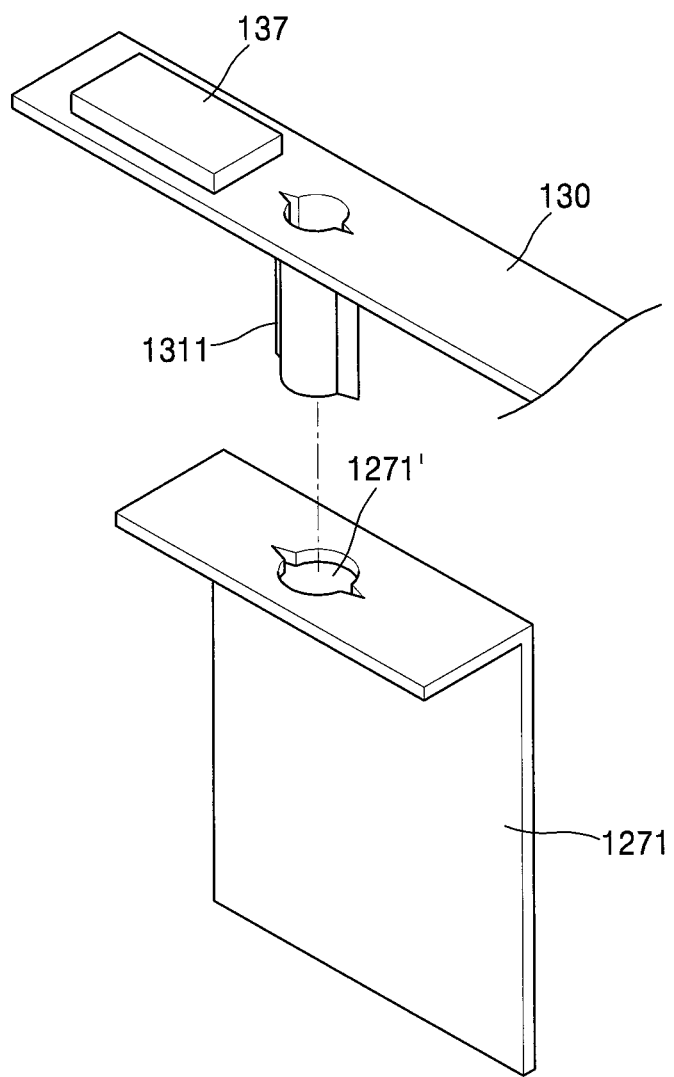
FIGS. 6 and 7 respectively are a perspective view and a side view of a coupling structure between a coupling pin and a positive electrode lead according to another exemplary embodiment.
Figure 7:
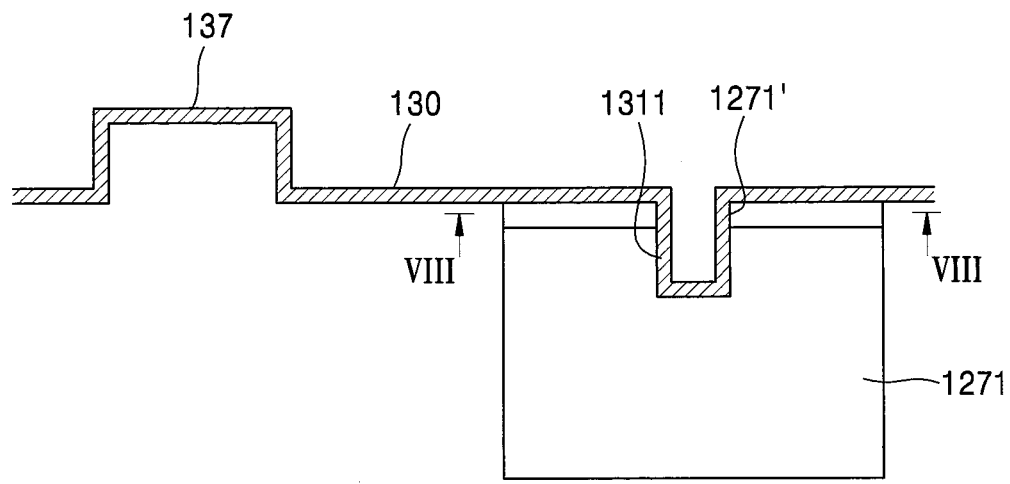

FIGS. 6 and 7 are a perspective view and a side view, respectively, of a coupling structure between a coupling pin 1311 and a positive electrode lead 1271, which may be applied to other exemplary embodiments. Also, FIG. 8A is a cross-sectional view of the coupling structure cut along the line VIII-VIII of FIG. 7.

Figure 8A:
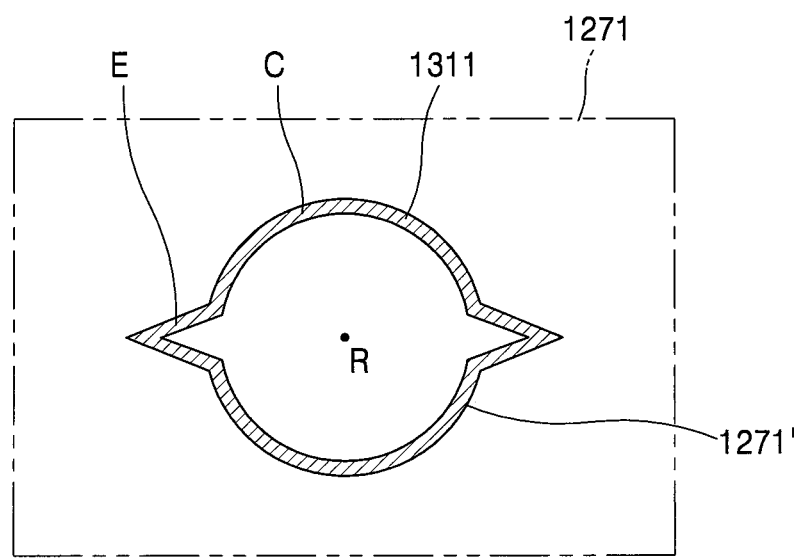
FIG. 8A is a cross-sectional view of the coupling structure cut along the line VIII-VIII of FIG. 7.

Referring to FIGS. 6, 7, and 8A, the coupling pin 1311 is integrally elongated from the cap plate 130. Here, the coupling pin 1311 has a non-circular cross-section. The non-circular cross-section may cause a shape of the coupling pin 1311 to change when the coupling pin 1311 is rotating about a center R of the coupling pin 1311. When the coupling pin 1311 has a non-circular cross-section, the shape of the coupling pin 1311 changes according to a rotation angle when the coupling pin 1311 rotates about the center R of the coupling pin 1311. Thus, forced rotation may generate rotation resistance.

As shown in FIG. 5, when the coupling pin 131 and the coupling hole 127' have circular cross-sections, a coupling strength for preventing the positive electrode lead 127 from arbitrarily rotating about the coupling pin 131 may be insufficient. That is, since contact areas of the coupling pin 131 and the positive electrode lead 127 are circular, coupling strength may be insufficient to prevent the coupling pin 131 and the positive electrode lead 127 from rotating relative to each other. For example, the circular coupling pin 131 does not change in shape according to a rotation angle when the coupling pin 131 rotates about the center R of the coupling pin 131. That is, even when the circular coupling pin 131 is arbitrarily rotated in the circular coupling hole 127', rotation resistance, which may suppress rotation, is not generated.

As shown in FIG. 8A, when the coupling pin 1311 has a non-circular cross-section, an arbitrary rotation of the coupling pin 1311 may be blocked by a coupling opening 1271' (e.g., a coupling hole 1271') that is formed correspondingly to the coupling pin 1311. According to an exemplary embodiment shown in FIG. 8A, the cross-section of the coupling pin 1311 may have a circular part C in the center and a wedge-shaped part E (e.g., a wedge part E) around the circular part C. Also, the coupling hole 1271' of the positive electrode lead 1271, to which the coupling pin 1311 is inserted, may have a shape that corresponds to that of the coupling pin 1311. That is, the coupling hole 1271' may have a circular part in the center and a wedge part around the circular part. In such a coupling structure having a non-circular cross-section, when the coupling pin 1311 tries to rotates relative to the coupling hole 1271' along an inner diameter of the coupling hole 1271', arbitrary rotation of the coupling pin 1311 may be blocked because the wedge part E of the coupling pin 1311 is inserted in the wedge part of the coupling hole 1271'. That is, since a relative rotation of the coupling pin 1311 may cause structural interference with the coupling hole 1271', the relative rotation of the coupling pin 1311 may be blocked.

Figure 8B:
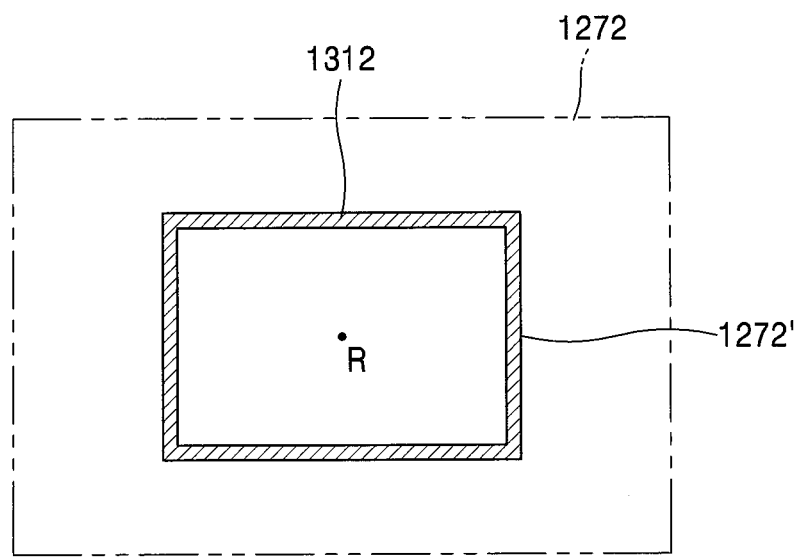
FIGS. 8B to 8E are cross-sectional views of a coupling structure between a coupling pin and a positive electrode lead which may be applied to other exemplary embodiments.

FIGS. 8B to 8E are cross-sectional views of a coupling structure between a coupling pin and a positive electrode lead which may be applied to other exemplary embodiments. Referring to FIG. 8B, a coupling pin 1312 may have a quadrilateral cross-section. A coupling opening 1272' (e.g., a coupling hole 1272') of a positive electrode lead 1272, to which the coupling pin 1312 is inserted, may also be quadrilateral shaped. When the coupling pin 1312 rotates relatively to the coupling hole 1272' along an inner diameter of the coupling hole 1272', the quadrilateral coupling pin 1312 may be blocked from freely rotating in the quadrilateral coupling hole 1272', and thus, an arbitrary rotation of the coupling pin 1312 may be prevented.

Figure 8C:
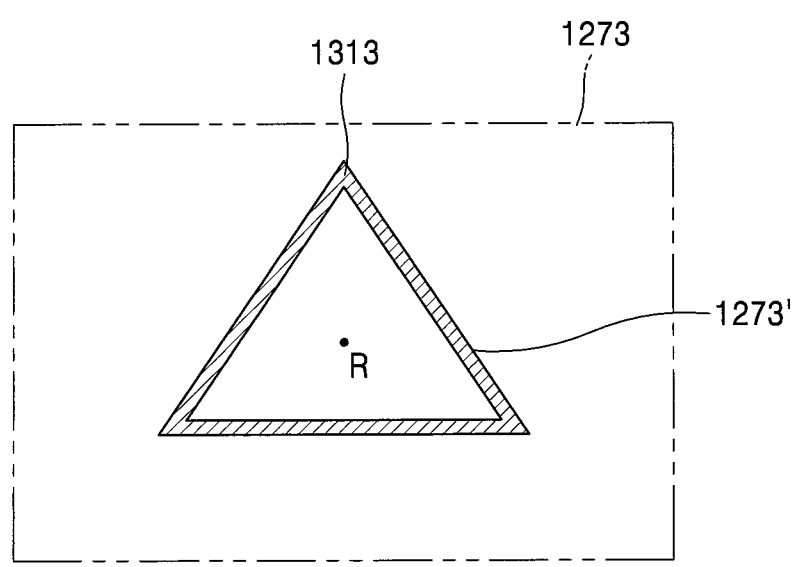
Figure 8D:
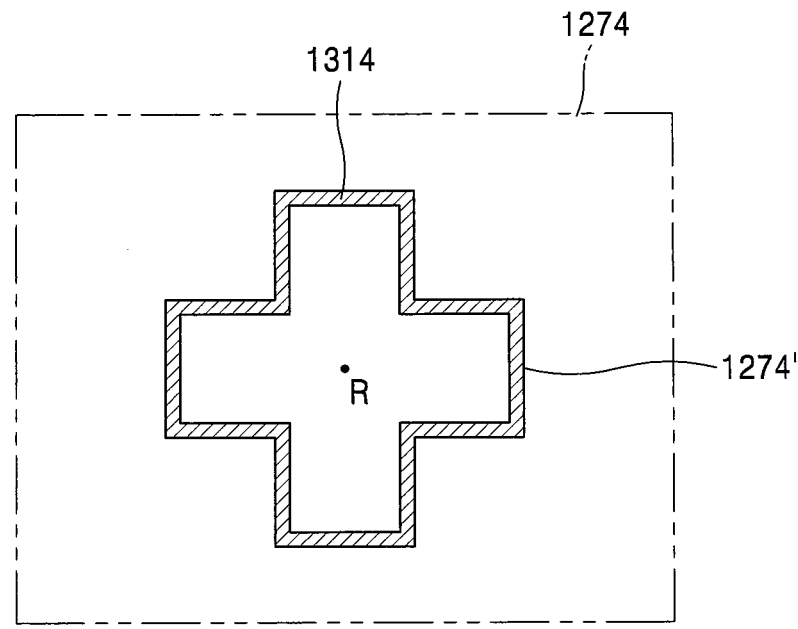

Referring to FIGS. 8C and 8D, coupling pins 1313 and 1314 and coupling openings 1273' and 1274' (e.g., coupling holes 1273' and 1274') may be angulated, e.g., triangular or cross shaped. When such angulated coupling pins 1313 and 1314 rotate relative to their respective coupling holes 1273' and 1274' along respective inner diameters of the angulated coupling holes 1273' and 1274', arbitrary rotations of the coupling pins 1313 and 1314 may be blocked.

Figure 8E:
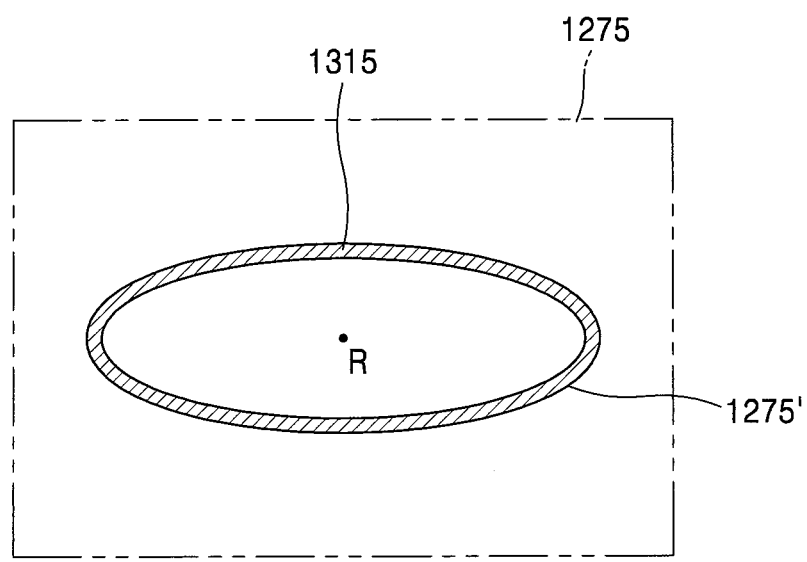

Referring to FIG. 8E, a coupling pin 1315 and a coupling opening 1275' (e.g., a coupling hole 1275') may have oval cross-sections. The oval cross-section may change in shape according to a rotation angle when the coupling pin 1315 rotates. Accordingly, when the coupling pin 1315 having an oval cross-section rotates along an inner diameter of the coupling hole 1275' having an oval cross-section that corresponds to the cross-section of the coupling pin 1315, relative rotation of the coupling pin 1315 may be blocked. Since an angular portion does not exist in an oval-shaped coupling structure, the oval-shaped coupling structure may be stronger against abrasion and deformation.

As described above, in order to prevent relative rotations between the coupling pins 1311 to 1315 and the positive electrode leads 1271 to 1275, for example, in order to prevent rotation of the positive electrode leads 1271 to 1275 to which the coupling pins 1311 to 1315 are respectively inserted, respective coupling cross-sections of the coupling pins 1311 to 1315 and the coupling holes 1271' to 1275' of the positive electrode lead 1271 to 1275 may be non-circular. Exemplary embodiments are not limited to the coupling structures having various non-circular cross-sections shown in FIGS. 8A and 8B. In other words, a coupling structure may have a non-circular cross-section of any shape as long as the coupling pins (which are coupled correspondingly to the coupling holes) are prevented from relatively rotating along respective inner diameters of the coupling holes.

Each of the positive electrode leads 1271 to 1275 may be coupled to the positive electrode tab 17 of the electrode assembly 10. When the positive electrode leads 1271 to 1275 rotate arbitrarily, it is not easy to couple, for example, weld the positive electrode leads 1271 to 1275 and the positive electrode tab 17 to each other. For example, the plurality of positive electrode tabs 17 that protrude from the electrode assembly 10 are welded to the positive electrode leads 1271 to 1275 when the plurality of positive electrode tabs 17 overlap the positive electrode leads 1271 to 1275 (for example, a second part of a positive electrode lead). Then, it is difficult to perform welding if the positive electrode leads 1271 to 1275 are arbitrarily rotated by external force. According to the exemplary embodiments, since the coupling pins 1311 to 1315 and the coupling holes 1271' to 1275' of the positive electrode leads 1271 to 1275 have non-circular cross-sections to prevent arbitrary rotations of the positive electrode leads 1271 to 1275, respective rotation positions of the positive electrode leads 1271 to 1275 may be fixed and the positive electrode leads 1271 to 1275 may be easily welded to the positive electrode tab 17.

The coupling pins 1311 to 1315 may be coupled to the positive electrode leads 1271 to 1275 by forced insertion, interference fit or friction fit. For example, when the coupling pins 1311 to 1315 that protrude downwardly from the cap plate 130 are respectively inserted into the coupling holes 1271' to 1275' of the positive electrode leads 1271 to 1275, the coupling pins 1311 to 1315 and the coupling holes 1271' to 1275' may be formed in shapes and sizes that correspond to one another so that respective outer diameters of the coupling pins 1311 to 1315 closely contact the respective inner diameters of the coupling holes 1271' to 1275'.

As shown in FIGS. 8A to 8E, when coupling structures among the coupling pins 1311 to 1315 and the coupling holes 1271' to 1275' are non-circular cross-section structures, the coupling pins 1311 to 1315 and the coupling holes 1271' to 1275' may be firmly coupled to one another without using an expensive coupling method, such as riveting or spinning, because relative rotations of the coupling pins 1311 to 1315 may be sufficiently prevented with only a forced insertion method that allows the coupling pins 1311 to 1315 and the coupling holes 1271' to 1275' to closely contact one another. For example, during riveting or spinning, lower ends of the coupling pins 1311 to 1315, which are inserted into the coupling holes 1271' to 1275' of the positive electrode leads 1271 to 1275, are respectively pressed onto areas around the coupling holes 1271' to 1275'. Since a strong force is transmitted to the cap plate 130 during riveting or spinning, the cap plate 130 may be deformed in shape. The deformed cap plate 130 cannot maintain co-planarity with the case 20 and thus may not be firmly coupled to the case 20. For example, the cap plate 130 and the case 20 may not be able to evenly contact each other, and small gaps may be formed in between. That is, even when the electrode assembly 10 may be sealed by covering the case 20 that accommodates the electrode assembly 10 with the cap plate 130 and welding by a laser, the cap plate 130 and the case 20 that do not closely contact each other cannot be firmly coupled to one another.

According to an exemplary embodiment, deformation of the cap plate 130 may be prevented by inserting the coupling pins 1311 to 1315 into the coupling holes 1271' to 1275' of the positive electrode leads 1271 to 1275 by force. Furthermore, according to an exemplary embodiment, the coupling pins 1311 to 1315 and the coupling holes 1271' to 1275' having non-circular cross-sections are respectively coupled to one another, and thus, relative rotations of the coupling pins 1311 to 1315 and the coupling holes 1271' to 1275' may be blocked. Therefore, a firm coupling structure may be formed even when using the forced insertion method.

However, a coupling method of the coupling pins 1311 to 1315 and the coupling holes 1271' to 1275' of the positive electrode leads 1271 to 1275 is not limited to the forced insertion method. For example, riveting or spinning may also be used.

Figure 9A:
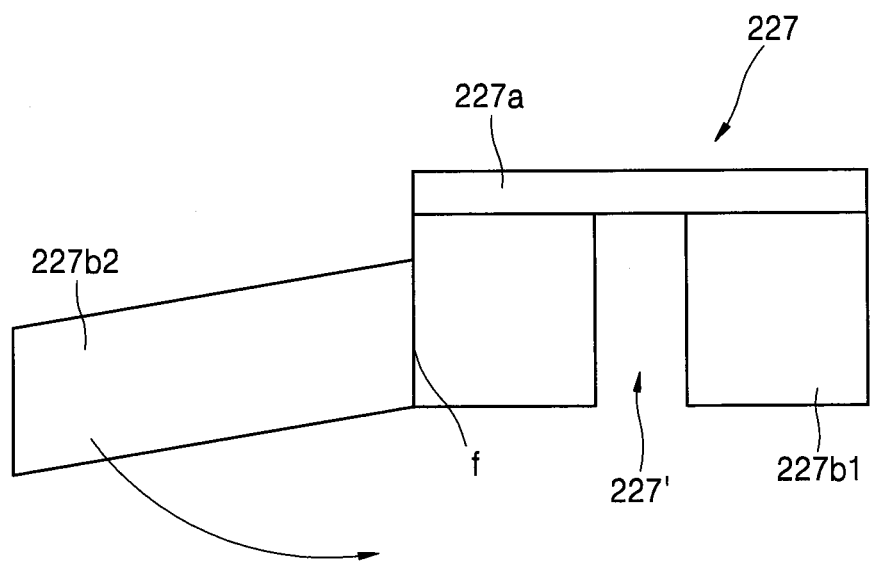
FIGS. 9A to 9C are side views of structures of a positive electrode lead that may be applied to modified exemplary embodiments.
Figure 9B:
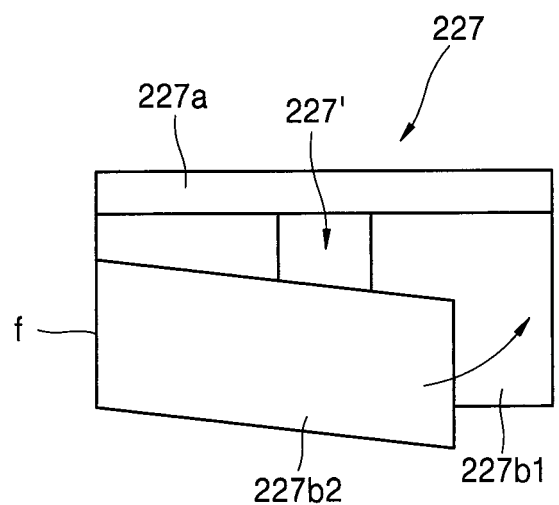
Figure 9C:
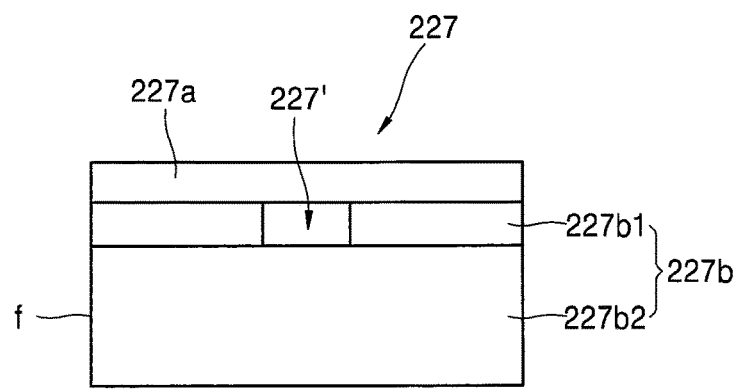

FIGS. 9A to 9C are side views of structures of a positive electrode lead 227 that may be applied to modified exemplary embodiments. The positive electrode lead 227 may be partially or entirely formed in two layers. The positive electrode lead 227 may include a first part 227*a* that is coupled to the cap plate 130, and a second part 227*b* that is coupled to the positive electrode tab 17. The second part 227*b* may include two layers. For example, as illustrated in the drawings, the second part 227*b* of the positive electrode lead 227 may have a two layer structure which includes a first layer 227*b*1 and a second layer 227*b*2. The first layer 227*b*1 contacts the first part 227*a* and is divided into two parts by an avoidance space 227'. The second layer 227*b*2 contacts the first layer 227*b*1 as a full plate. The second layer 227*b*2 may be folded such that it overlaps the first layer 227*b*1 around a fold f (or folded portion f), such that the second part 227*b* has a two layer structure. The second layer 227*b*2 may cover a portion of the avoidance space 227' formed in the first layer 227*b*1. The second layer 227*b*2 may be narrower than the first layer 227*b*1 such that at least a portion of the avoidance space 227' (a portion of the avoidance space 227' that is near the first part 227*a*) is exposed, as illustrated in FIG. 9C.

If the positive electrode lead 227 partially or entirely includes two layers, mechanical strength of the positive electrode lead 227 may be increased. An increase in the mechanical strength of the positive electrode lead 227 may restrict movement of the positive electrode lead 227. As shown in FIG. 9C, the second part 227*b* may be a plate in which the avoidance space 227' is an opening or a hole. Although the second part 227*b* may be two layers, according to other exemplary embodiments, the second part 227*b* may be a single layer structure in which the avoidance space 227' is an opening or a hole.

Figure 10A:
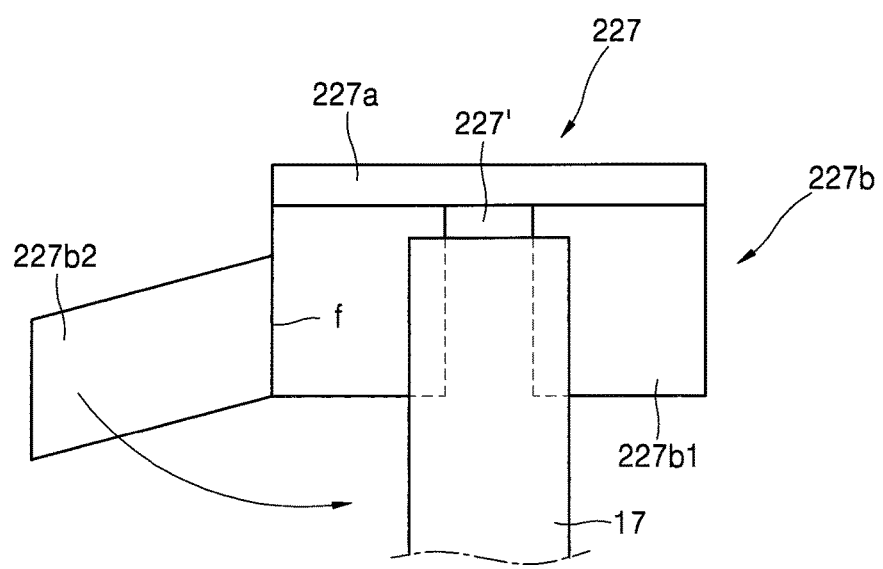
FIGS. 10A and 10B are side views of various structures in which the positive electrode lead of FIGS. 9A to 9C is applied.
Figure 10B:
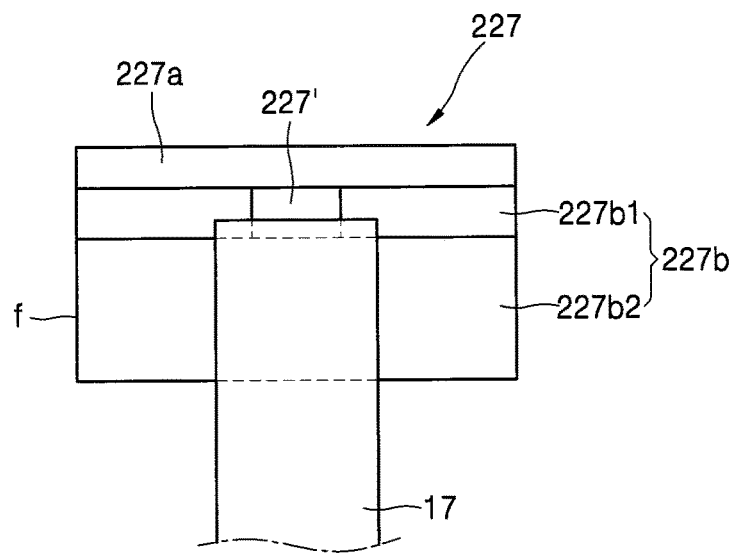

FIGS. 10A and 10B are side views of various structures in which the positive electrode lead 227 of FIGS. 9A to 9C is applied. For example, as illustrated in FIGS. 10A and 10B, the second part 227*b* of the positive electrode lead 227, which is coupled to the positive electrode tab 17, may be two layers. As illustrated in FIG. 10A, the positive electrode tab 17 may be between the first layer 227*b*1 and the second layer 227*b*2. For example, the positive electrode tab 17 overlaps with a portion of the first layer 227*b*1, and the second layer 227*b*2 covers the positive electrode tab 17. For example, the first layer 227*b*1 and the second layer 227*b*2 may be disposed at the front and back of the positive electrode tab 17, respectively, such that the positive electrode tab 17 is covered, and then the positive electrode lead 227 and the positive electrode tab 17 may be welded together. This may improve welding strength since the positive electrode lead 227, which includes the first and second layers 227*b*1 and 227*b*2, covers the positive electrode tab 17.

If the positive electrode tab 17 is directly welded onto the first layer 227*b*1, the welding strength may be decreased due to welding area decrease caused by the avoidance space 227'. Therefore, the positive electrode tab 17 and the second layer 227*b*2 (that has a more uniform shape and no avoidance space) may be welded.

According to the exemplary embodiment illustrated in FIG. 10B, the second layer 227*b*2 may be disposed on the first layer 227*b*1, and then, the positive electrode tab 17 may be disposed on the positive electrode lead 227. For example, a portion of the positive electrode tab 17 may contact the first layer 227*b*1 and a portion of the positive electrode tab 17 may contact the second layer 227*b*2 and then welded. Similar to the description above, if the positive electrode tab 17 is directly welded onto the first layer 227*b*1, the welding strength may decrease due to welding area decrease caused by the avoidance space 227'. Therefore, the second layer 227*b*2 (that has a more uniform shape) and the positive electrode tab 17 may be welded.

Figure 11:
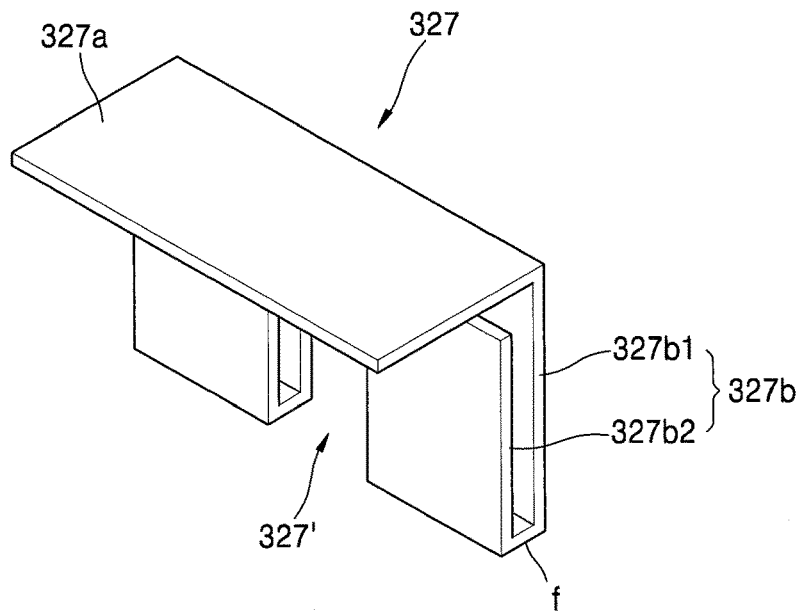
FIG. 11 is a perspective view of a structure of a positive electrode lead according to another exemplary embodiment.

FIG. 11 is a perspective view of a structure of a positive electrode lead 327 according to another exemplary embodiment. The positive electrode lead 327 includes a second part 327*b* that includes two layers and is coupled to the positive electrode tab 17. For example, a first layer 327*b*1 and a second layer 327*b*2 of the second part 327*b* both include an avoidance space 327'. For example, the first and second layers 327*b*1 and 327*b*2 are connected to each other and bent with respect to each other around a fold f (or folded portion f) to form two layers of the second part 327*b*. For example, the second layer 327*b*2 may be bent around the fold f in a generally upward direction, such that an end of the second layer 237*b*2 is near a first part 327*a*. The second layer 327*b*2 may be bent upward to contact the first part 327*a*. For example, the first layer 327*b*1 and the second layer 327*b*2 may be folded around the fold f and both extend in a generally upward direction such that the first and second layers 327*b*1 and 327*b*2 are substantially parallel. This may increase the strength of the fold f since the first and second layers 327*b*1 and 327*b*2 may both support the first part 327*a*.

Figure 12:
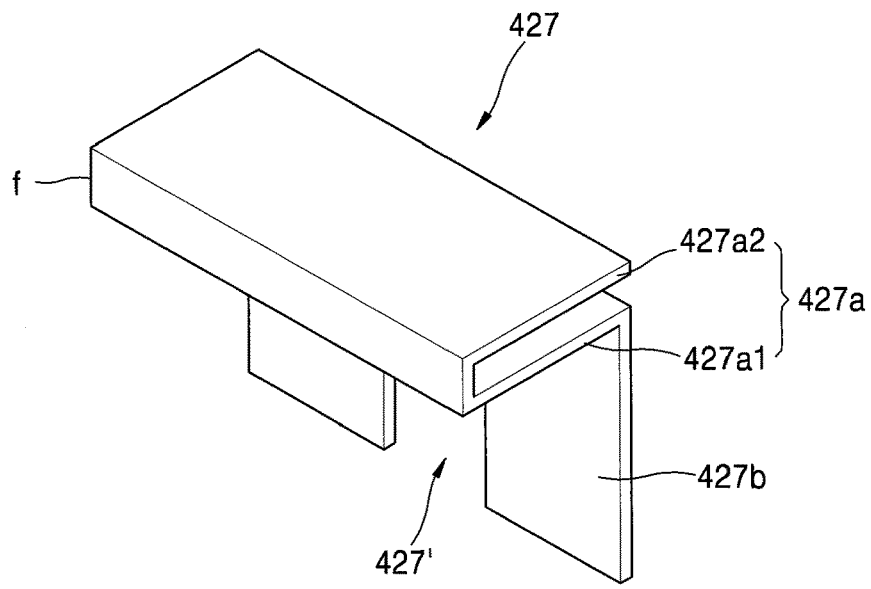
FIG. 12 is a perspective view of a structure of a positive electrode lead according to another exemplary embodiment.

FIG. 12 is a perspective view of a structure of a positive electrode lead 427 according to another exemplary embodiment. The positive electrode lead 427 includes a first part 427*a* that is coupled to the cap plate 130 and includes two layers. The first part 427*a* includes a first layer 427*a*1 and a second layer 427*a*2 that may, for example, be bent in a direction toward each other around a fold f (or folded portion f), such that the first layer 427*a*1 is substantially parallel to the second layer 427*a*2.

Figure 13:
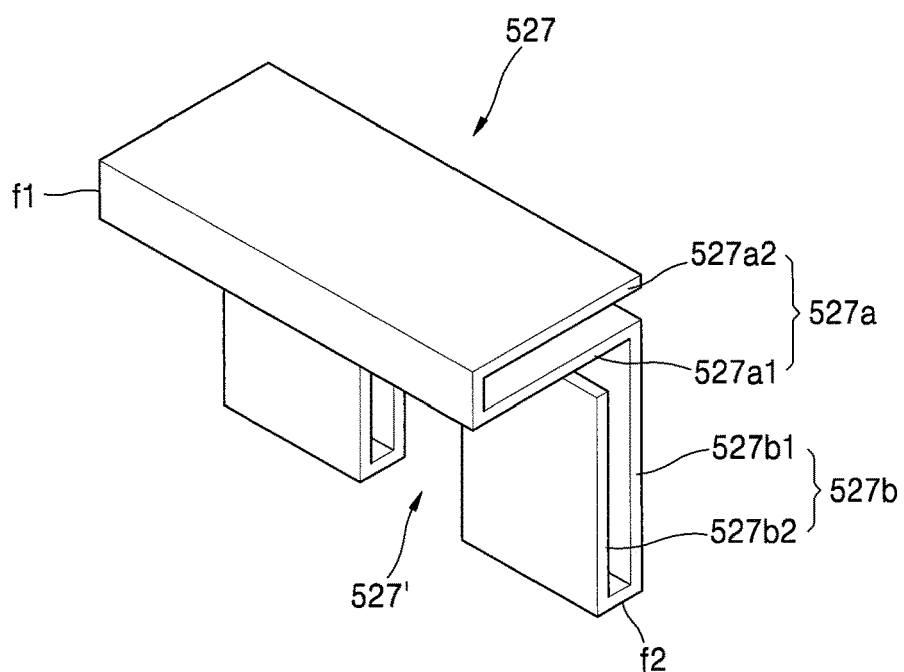
FIG. 13 is a perspective view of a structure of a positive electrode lead according to another exemplary embodiment.

FIG. 13 is a perspective view of a structure of a positive electrode lead 527 according to another exemplary embodiment. Referring to FIG. 13, the positive electrode lead 527 includes a first part 527a and a second part 527b each including two layers. For example, the first part 527a includes a first layer 527a1 and a second layer 527a2 that are substantially parallel to each other around a first fold f1, and the second part 527b includes a first layer 527b1 and a second layer 527b2 that are substantially parallel to each other around a second fold f2.

Figure 14A:
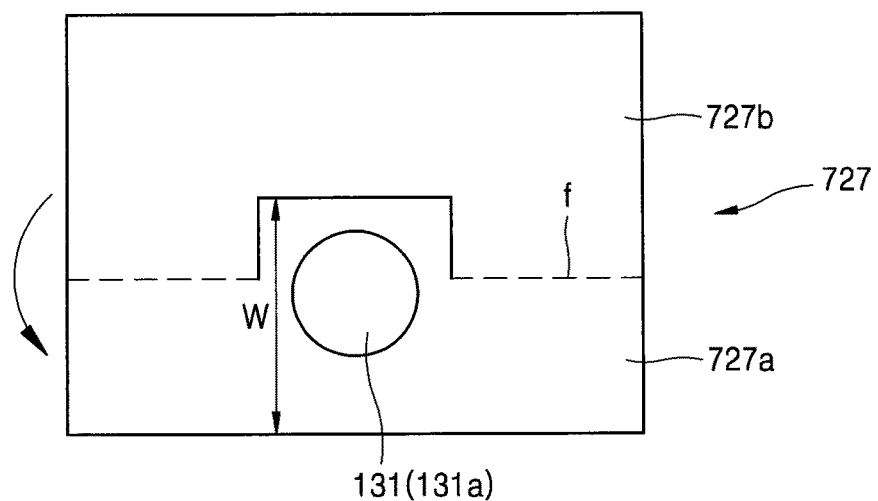
FIGS. 14A to 14C are top views and a perspective view of a structure of an electrode lead that may be applied to other exemplary embodiments.
Figure 14B:
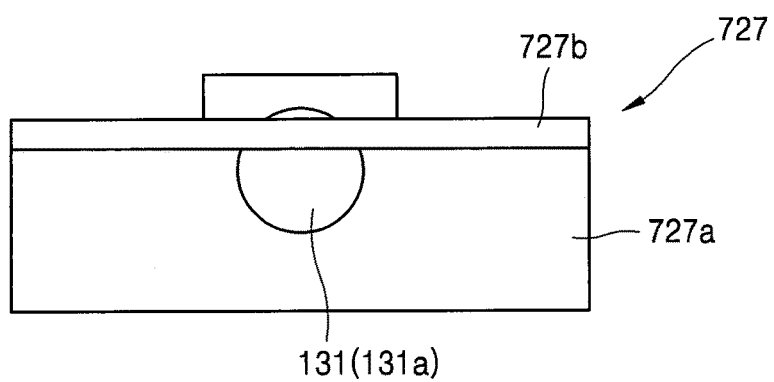
Figure 14C:
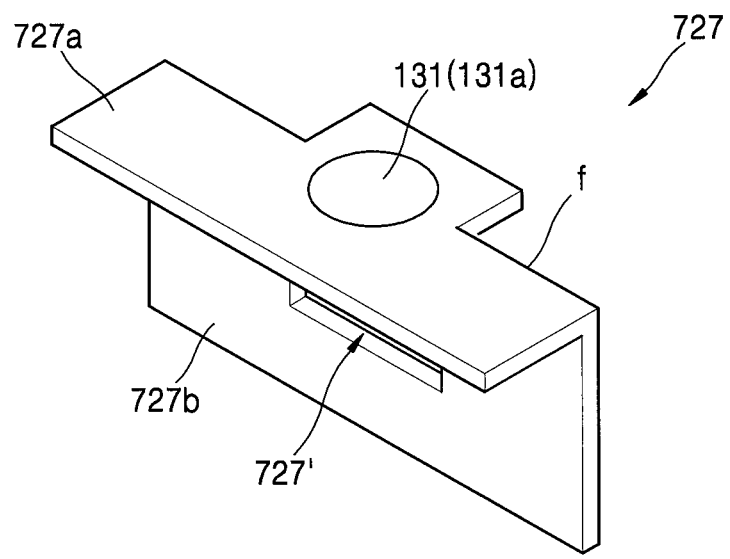

FIGS. 14A to 14C are top views and a perspective view of a structure of an electrode lead 727 that may be applied to other exemplary embodiments. Referring to FIGS. 14A to 14C, the electrode lead 727 includes a first part 727a that is coupled to a cap plate, and a second part 727b that extends from the first part 727a to an electrode tab of an electrode assembly.

The first and second parts 727a and 727b of the electrode lead 727 are bent with respect to each other along two folds f (or folded portions f). In some embodiments, the first part 727a may expand between the folds f that are spaced apart.

The coupling pin 131, which is connected to a cap plate 130, is positioned or formed in the first part 727a. Since a lower end 131a of the coupling pin 131 is pressed at a coupling location of the coupling pin 131, the coupling pin 131 may be formed over a large area to improve coupling strength. Also, the second part 727b coupled to an electrode assembly (for example, coupled to an electrode tab) may be formed at the center of the electrode assembly (i.e., at the center of the first part 727a in a width direction W) to increase coupling strength with the electrode assembly.

As a result, at the coupling location of the coupling pin 131, a portion of the first part 727a between the folds f expands such that an area of the first part 727a that is coupled to the cap plate 130 increases in size. Also, the folds f, which form a boundary between the first and second parts 727a and 727b, may be formed as close to the center as possible along the width direction W of the first part 727a. In addition, as shown in FIG. 14C, the second part 727b bent with respect to the first part 727a along the folds f may include an avoidance space 727' to accommodate the lower end 131a of the coupling pin 131. The avoidance space 727' may be formed between the folds f that are spaced apart.

Figure 15A:
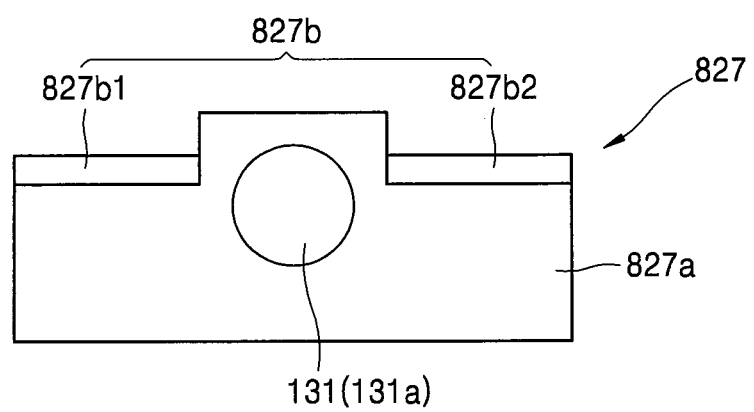
FIGS. 15A and 15B are a top view and a perspective view, respectively, of a structure of an electrode lead that may be applied to other exemplary embodiments.
Figure 15B:
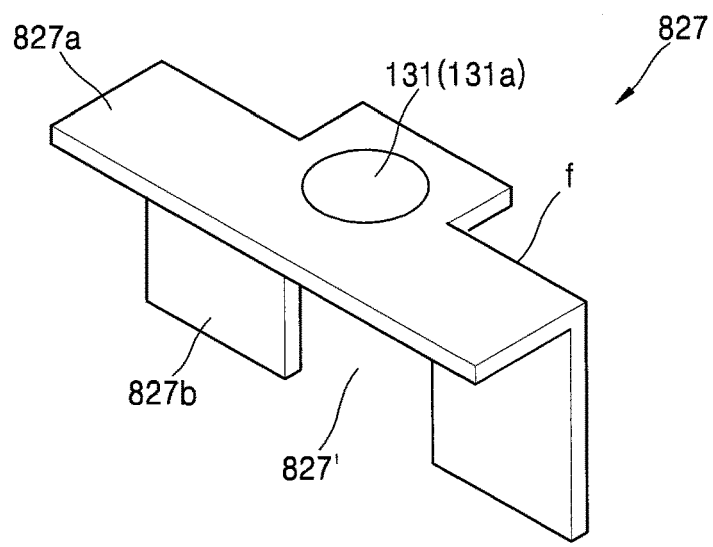

FIGS. 15A and 15B are a top view and a perspective view, respectively, of a structure of an electrode lead 827 that may be applied to other exemplary embodiments. Referring to FIGS. 15A and 15B, the electrode lead 827 includes a first part 827a that is coupled to a cap plate, and a second part 827b that extends from the first part 827a to an electrode tab of an electrode assembly. According to the present exemplary embodiment, the second part 827b may be divided into two parts 827b1 and 827b2. The electrode lead 827 may provide an avoidance space 827' for avoiding interference with the coupling pin 131 that couples the electrode lead 827 with the cap plate.

Figure 16:
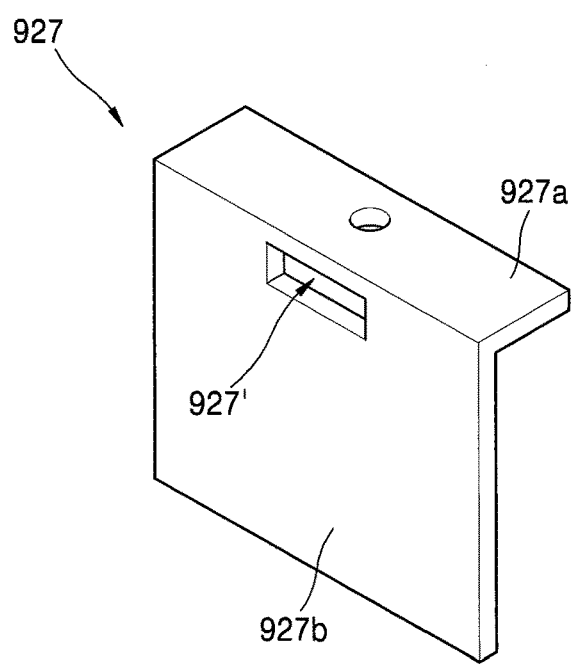
FIG. 16 is a perspective view of a structure of an electrode lead that may be applied to other exemplary embodiments.

FIG. 16 is a perspective view of a structure of an electrode lead 927 that may be applied to other exemplary embodiments. Referring to FIG. 16, the electrode lead 927 includes a first part 927a that is coupled to a cap plate, and a second part 927b that extends from the first part 927a to an electrode tab of an electrode assembly. The electrode lead 927 may provide an avoidance space 927' for avoiding interference with the coupling pin 131 that couples the electrode lead 927 with the cap plate. For example, the second part 927b may be a plate with the avoidance space 927' punched as an opening or a hole.

According to exemplary embodiments, a coupling pin that is elongated downwardly from a cap plate is used to electrically connect the cap plate and an electrode assembly. Thus, welding is not additionally necessary to form the coupling pin. Also, since an interface between different elements is not formed between the cap plate and the coupling pin, electrical resistance may be reduced and output performance of a battery may be improved.

According to exemplary embodiments, an avoidance space is provided to avoid physical interference between the coupling pin and the electrode lead. The avoidance space may accommodate an end of the coupling pin, which is expanded by riveting or spinning, and prevent interference between the end of the coupling pin and an electrode lead. This may prevent structure modification, be stronger against abrasion, and thus increase durability.

While one or more exemplary embodiments have been described with reference to the figures, it will be understood by those of ordinary skill in the art that various changes in form and details may be made therein without departing from the spirit and scope as defined by the following claims.

What is claimed is:

1. A battery comprising:
   an electrode assembly;
   a case accommodating the electrode assembly;
   a cap plate sealing an upper portion of the case;
   a coupling pin elongated downwardly from the cap plate toward the electrode assembly such that the coupling pin is concave when the cap plate is viewed from above and convex when the cap plate is viewed from below;
   an electrode lead coupled to the coupling pin, wherein the electrode lead electrically connects the coupling pin and the electrode assembly to one another and defines a coupling hole into which the coupling pin is inserted; and
   wherein the coupling pin and the coupling hole have corresponding non-circular cross-sections.

2. The battery of claim 1, wherein the coupling pin extends from the cap plate without a joint.

3. The battery of claim 1, wherein the coupling pin and the cap plate are monolithic.

4. The battery of claim 1, wherein the coupling pin and the coupling hole have angular cross-sections.

5. The battery of claim 1, wherein the coupling pin and the coupling hole have oval cross-sections.

6. The battery of claim 1, wherein the coupling pin and the coupling hole each comprise a circular part and at least one wedge-shaped part protruding from an outer diameter of the circular part.

7. The battery of claim 1, wherein the coupling pin closely contacts the coupling hole and is fixed in the coupling hole by forced insertion.

8. A battery comprising:
   an electrode assembly;
   a case accommodating the electrode assembly;
   a cap plate sealing an upper portion of the case;
   a coupling pin protruding downwardly from the cap plate toward the electrode assembly; and
   an electrode lead coupled to the coupling pin, wherein the electrode lead electrically connects the coupling pin and the electrode assembly to one another, the electrode lead comprising:
      a first part that faces and is coupled to the cap plate; and
      a second part bent relative to the first part and that faces and is coupled to an electrode tab projecting from the electrode assembly;
   wherein the electrode lead comprises a portion defining an avoidance space to accommodate a lower end of the coupling pin; and
   wherein at least a portion of the second part of the electrode lead is divided into two parts, respective end faces of the two parts facing each other and defining the avoidance space in between, wherein the two parts are in the same plane.

9. The battery of claim 8, wherein the lower end of the coupling pin, which is exposed through a lower surface of the electrode lead, is pressed onto the electrode lead by riveting or by a spinning process.

10. The battery of claim 8, wherein the second part of the electrode lead has the shape of a plate and the avoidance space in the second part is a hole.

11. The battery of claim 8, wherein the second part of the electrode lead comprises a first layer and a second layer, and the electrode tab is between the first and second layers.

12. The battery of claim 8, wherein the second part of the electrode lead comprises a first layer and a second layer, and the electrode tab is on the first and second layers.

13. The battery of claim 8, wherein the second part of the electrode lead comprises:
a first layer comprising the two parts separated by the avoidance space therebetween, and
a second layer comprising a plate,
wherein the second layer covers a portion of the avoidance space of the first layer.

14. The battery of claim 8, wherein the second part of the electrode lead comprises a first layer and a second layer, and each of the first and second layers comprises two parts separated by an avoidance space therebetween.

15. The battery of claim 8, wherein the electrode lead comprises folds that connect the first and second parts such that the first and second parts are bent with respect to each other, and
the first part is expanded between two folds that are spaced apart.

16. The battery of claim 15, wherein the coupling pin, which extends through the electrode lead, is coupled to an expanded portion of the first part.

* * * * *